(12) United States Patent
Tang et al.

(10) Patent No.: US 7,912,648 B2
(45) Date of Patent: Mar. 22, 2011

(54) METHOD AND APPARATUS FOR IMAGING BED BOUNDARIES USING AZIMUTHAL PROPAGATION RESISTIVITY MEASUREMENTS

(75) Inventors: Xiao M. Tang, Sugar Land, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 225 days.

(21) Appl. No.: 12/243,058

(22) Filed: Oct. 1, 2008

(65) Prior Publication Data

US 2009/0138202 A1 May 28, 2009

Related U.S. Application Data

(60) Provisional application No. 60/997,501, filed on Oct. 2, 2007.

(51) Int. Cl.
*G01V 3/30* (2006.01)

(52) U.S. Cl. ............ 702/7; 702/9; 702/12; 175/40; 175/50; 175/17; 324/343; 324/338; 324/339

(58) Field of Classification Search ............ 702/7, 9, 702/11, 12; 175/40, 50, 17, 57; 367/183, 367/85; 340/890.03, 855.3; 324/343, 338, 324/339
See application file for complete search history.

(56) References Cited

U.S. PATENT DOCUMENTS

| | | | | |
|---|---|---|---|---|
| 5,448,227 A * | 9/1995 | Orban et al. | ............ | 340/854.4 |
| 6,176,323 B1 * | 1/2001 | Weirich et al. | ............ | 175/40 |
| 6,220,087 B1 * | 4/2001 | Hache et al. | ............ | 73/152.46 |
| 6,272,434 B1 * | 8/2001 | Wisler et al. | ............ | 702/9 |
| 6,476,609 B1 | 11/2002 | Bittar | | |
| 6,911,824 B2 | 6/2005 | Bittar | | |
| 7,019,528 B2 | 3/2006 | Bittar | | |
| 7,044,238 B2 * | 5/2006 | Hutchinson | ............ | 175/50 |
| 7,057,392 B2 | 6/2006 | Wang et al. | | |
| 7,138,803 B2 | 11/2006 | Bittar | | |
| 7,202,670 B2 * | 4/2007 | Omeragic et al. | ............ | 324/338 |
| 7,265,552 B2 | 9/2007 | Bittar | | |
| 7,492,664 B2 * | 2/2009 | Tang et al. | ............ | 367/31 |
| 7,586,087 B2 * | 9/2009 | Dong et al. | ............ | 250/255 |
| 2003/0014190 A1 * | 1/2003 | Dubinsky et al. | ............ | 702/7 |
| 2003/0076107 A1 | 4/2003 | Fanini et al. | | |
| 2004/0158404 A1 | 8/2004 | Gaston et al. | | |
| 2004/0158997 A1 * | 8/2004 | Tang | ............ | 33/304 |
| 2005/0024060 A1 | 2/2005 | Bittar | | |
| 2005/0083063 A1 * | 4/2005 | Omeragic et al. | ............ | 324/338 |

(Continued)

OTHER PUBLICATIONS

S. Fang, et al. "Determination of Structural Dip and Azimuth from LWD Azimuthal Propagation Resistivity Measurements in Anisotropic Formations" SPE 116123. 2008 SPE Annual Technical Conference and Exhibition held in Denver, Colorado, USA Sep. 21-24, 2008.

(Continued)

*Primary Examiner* — Carol S Tsai
(74) *Attorney, Agent, or Firm* — Cantor Colburn LLP

(57) ABSTRACT

A method for imaging a geologic deposit using data collected from a borehole includes: selecting an instrument for performing electromagnetic (EM) measurements, the instrument including at least one transmitter and at least one orthogonally oriented receiver; obtaining EM measurement data from the borehole with the instrument; transforming the EM measurement data to acoustic data; and estimating at least one of a direction and a distance from the instrument to the deposit from the data. A computer program product and a system are provided.

22 Claims, 11 Drawing Sheets

U.S. PATENT DOCUMENTS

| | | | |
|---|---|---|---|
| 2005/0140373 A1* | 6/2005 | Li et al. | 324/338 |
| 2006/0266553 A1* | 11/2006 | Hutchinson | 175/50 |
| 2007/0235225 A1 | 10/2007 | Bittar | |
| 2008/0253228 A1* | 10/2008 | Camwell et al. | 367/82 |
| 2008/0290873 A1* | 11/2008 | Homan et al. | 324/337 |

OTHER PUBLICATIONS

D. Georgi, et al. "Biaxial Anisotropy: Its Occurrence and Measurement with Multi-component Induction Tools". SPE 114739. 2008 SPE Annual Technical Conference and Exhibition held in Denver, Colorado, USA Sep. 21-24, 2008.

International Search Report for International Application PCT/US 08/78578 mailed Dec. 5, 2008.

Written Opinion for International Application PCT/US 08/78578 mailed Dec. 5, 2008.

Wang et al., Dipping bed response and inversion for distance to bed for a new while-drilling resistivity measurement, SEG/New Orleans 2006 Annual Meeting, pp. 416-420.

Tang et al, Processing array acoustic-logging data to image near-borehole geologic structures, Geophysics, vol. 72, No. 2 (Mar.-Apr. 2007); pp. E87-E97, Houston Technology Center Houston, TX.

Lee et al, Electromagnetic traveltime tomography using an approximate wavefield transform, Geophysics, vol. 67, No. 1 (Jan.-Feb. 2002) pp. 68-76.

Lee et al., A new approach to imaging with low-frequency electromagnetic fields, Geophysics, vol. 58, No. 6 (Jun. 1993), pp. 780-796, Berkley, CA.

Bell et al., Navigating and Imaging in Complex Geology with Azimuthal Propagation Resistivity While Drilling, SPE 102637, Society of Petroleum of Engineers, Copyright 2006, pp. 14.

Ward, S. H., 1971, Electromagnetic theory for geophysical applications: Mining Geophysics, V. 2, Society of Exploration Geophysicists.

* cited by examiner $$q_{traval} = \sqrt{\mu\sigma}\sqrt{X^2 + 4z^2}$$

US 7,912,648 B2

METHOD AND APPARATUS FOR IMAGING BED BOUNDARIES USING AZIMUTHAL PROPAGATION RESISTIVITY MEASUREMENTS

CROSS REFERENCE TO RELATED APPLICATIONS

This application is filed under 37 CFR §1.53(b) and claims benefit of an earlier filing date under 35 U.S.C. 120 to U.S. Provisional Patent Application No. 60/997,501, filed Oct. 2, 2007, which is incorporated by reference herein in its entirety.

BACKGROUND OF THE INVENTION

1. Field of the Invention

The invention is related generally to oil field exploration and in particular to use of at least one of multi-component induction measurements and propagation measurements for geosteering and formation evaluation.

2. Description of the Related Art

In the fields of oil and gas (hydrocarbon) and exploration and production, an azimuthal propagation resistivity (APR) tool has been used with an orthogonal transmitter-receiver system to detect the electromagnetic response arising from near-borehole geologic bed boundaries. The measurements have been very useful for determining the azimuth of a boundary around borehole.

With the ability to acquire the azimuth information, real-time detection of features such as a bedding plane as a function of distance from a well is desired. For example, real-time application of such information makes it possible to steer a drill bit to desired locations.

Accordingly, what are needed are techniques for determining a distance to a bedding plane using resistivity measurements collected while drilling.

SUMMARY OF THE INVENTION

In one embodiment, the invention includes a method for imaging a geologic deposit using data collected from a borehole, the method including: selecting an instrument for performing electromagnetic (EM) measurements, the instrument including at least one transmitter and at least one orthogonally oriented receiver; obtaining EM measurement data from the borehole with the instrument; transforming the EM measurement data to acoustic data; and estimating at least one of a direction and a distance from the instrument to the deposit from the acoustic data.

In another embodiment, the invention includes a computer program product including machine executable instructions stored on machine readable media for identifying a boundary of a geologic feature, the instructions including instructions for: obtaining electromagnetic (EM) measurement data from a borehole near the geologic feature with an EM instrument including at least one transmitter and at least one orthogonally oriented receiver; relating the resulting electromagnetic field to a pseudo wavefield; estimating at least one component of an associated magnetic field; and transforming the at least one component to a time domain to obtain an response for the boundary.

In a further embodiment, the invention includes a system for steering a drill string, the system including: an electromagnetic (EM) instrument including at least one transmitter and at least one orthogonally oriented receiver comprised with the drill string; at least one processor including machine executable instructions stored on machine readable media for receiving electromagnetic (EM) measurement data from the instrument and relating the resulting electromagnetic field to a pseudo wavefield; estimating at least one component of an associated magnetic field; transforming the at least one component to a time domain to obtain an response for a boundary of a geologic feature; and generating steering commands from the response for the boundary; and a steering system for receiving the steering commands and adjusting a direction of the drill string.

BRIEF DESCRIPTION OF THE DRAWINGS

The foregoing and other aspects of the invention will be best appreciated with reference to the disclosure which follows, when read in conjunction with the Figures, herein, where:

FIG. 5B depicts simulated transient signals; and FIG. 5C depicts pseudo waves transformed from the electromagnetic signals showing an acoustic reflection moveout;

FIG. 6A depicts a cross-bed simulation of a logging-while-drilling (LWD) instrument using exact and asymptotic modeling, FIG. 6B shows amplitude responses and FIG. 6C shows phase responses produced by methods provided herein and are provided to demonstrate validity of asymptotic modeling;

DETAILED DESCRIPTION OF THE INVENTION

The invention provided herein includes method and apparatus for imaging geologic bed boundaries near a wellbore using electromagnetic (EM) signals arising from the boundaries. In some embodiments, the EM signals are generated by an EM instrument that includes at least one transmitter disposed orthogonally with at least one receiver. An asymptotic solution for EM responses is derived. A fitness function is calculated using the solution, and fits both amplitude and phase of the measured EM data. Imaging processing is accomplished by mapping the fitness function into the formation surrounding the wellbore. Tracking the maximum of the fitness function image may be performed to delineate the bed boundary(s) in the formation. The image quality measures a goodness of fit between the model and the data, and therefore provides quality control for the image processing.

Resulting image information may be combined with azimuth information from measurements, and used for significant improvements to drill steering. That is, the methods and apparatus provided herein result in fast production of accurate information useful for locating desired geologic deposits while drilling.

As discussed herein, the term "bed," "bedding plane" and other similar terms are taken to refer to geologic deposits of interest. Such deposits likely include hydrocarbon materials. Inherently, such deposits include boundaries with surrounding formations. As a part of the teachings herein, identification and mapping of at least a portion of a boundary (such as a boundary near the wellbore 7) is made possible.

Figure 1:
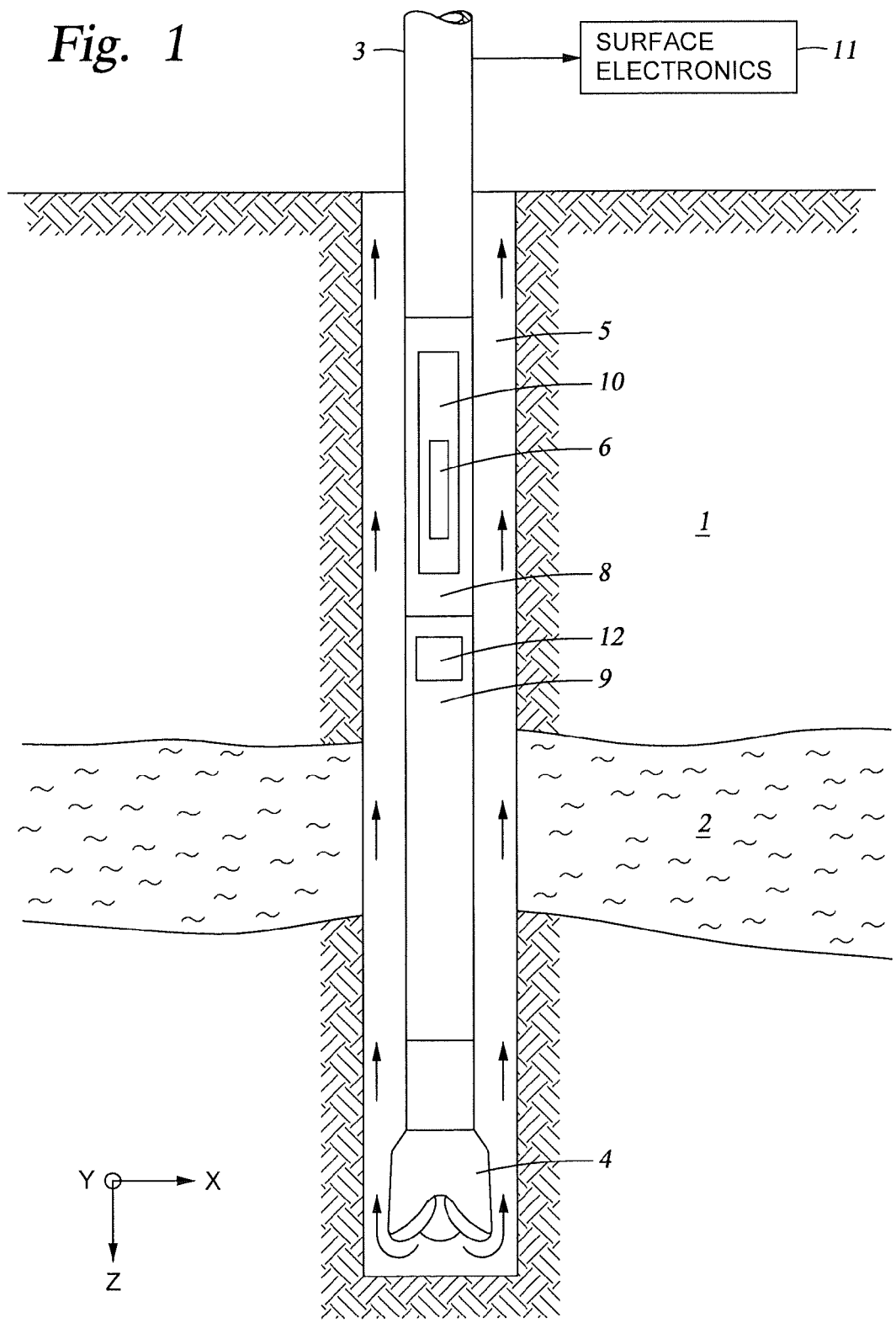
FIG. 1 depicts aspects of a drilling apparatus in a wellbore.

Refer now to FIG. 1 where aspects of a drill string 3 are shown. In FIG. 1, an exemplary embodiment of an apparatus for performing logging while drilling is shown. In this example, a section of earth 1, which includes at least one formation 2, is penetrated by the drill string 3. The drill string 3 drives a drill bit 4. In this example, the drill bit 4 also provides a flow of a drilling fluid 5, such as drilling mud. That is, the drilling fluid 5 may be pumped downhole through the drilling pipe 8, and thus resulting in an upward flow of the drilling fluid 5 within a resulting borehole 7 (also referred to as a "wellbore").

The drill string 3 may include a plurality of sections of the drill pipe 8. The drill pipe 8 may include wired pipe providing users with a communications channel. Included within the drill string 3 may be at least one logging apparatus 9. Exemplary logging apparatus include devices implementing resistivity, nuclear magnetic resonance, acoustic, seismic and other such technologies. Generally, included with the logging apparatus 9 is a package of downhole electronics 12. The downhole electronics 12 generally provide for collection and/or communication of downhole data to a package of surface based electronics 11. Included in this drill string 3 is a electromagnetic (EM) instrument 10 (also referred to herein as a "tool"). The drill string 3 may also be referred to as "drill stem," and by other similar terms.

Collectively, the logging apparatus 9 and the associated electronics 11, 12 provide for such tasks as imaging of the at least one formation 2. In addition, the logging apparatus 9 and the associated electronics 11, 12 may provide for collection and/or communication of other information, such as resistivity measurements collected with the EM instrument 10.

Generally, the EM instrument 10 operable for performing local measurements of resistivity, including measurement through the drilling fluid 5 and into the earth 1. The EM instrument 10 may be powered by at least one of the electronics units 11, 12 and provide a signal to at least one of the electronics units 11, 12. In some embodiments, and as described herein, each of the electronics unit(s) 11, 12 may, alone or in combination, provide imaging information that is descriptive of aspects of the sub-surface materials in the surrounding earth 1.

The EM instrument 10 generally includes a coil mandrel unit 6 that includes a set of coils which includes induction transmitter coils and receiver coils. The set of coils, as will be further explained, are for inducing electromagnetic fields in the formations 2 and for receiving voltage signals induced by eddy currents flowing in the formations 2 as a result of the electromagnetic fields induced therein.

The electronics units 11, 12 may include, for example, a receiver, signal processing capabilities and telemetry capabilities (not shown). Further included may be a signal generator and power amplifiers (not shown), which may be used to cause alternating currents (AC) of selected frequencies to flow through transmitter coils in the coil mandrel unit 6.

In typical embodiments, at least one of the electronics units 11, 12 includes a receiver circuit (not shown) for detecting voltages induced in receiver coils in the coil mandrel unit 6, and circuits for processing these received voltages (not shown) into signals representative of the conductivities of various layers of the formations 2. As a matter of convenience, the downhole electronics unit 12 typically includes signal telemetry to transmit conductivity related signals to the surface of the earth 7 via the cable 6 for further processing. Alternatively, the downhole electronics unit 12 can store the conductivity related signals in an appropriate recording device (not shown) for processing after the instrument 10 is withdrawn from the wellbore 7.

Figure 2:
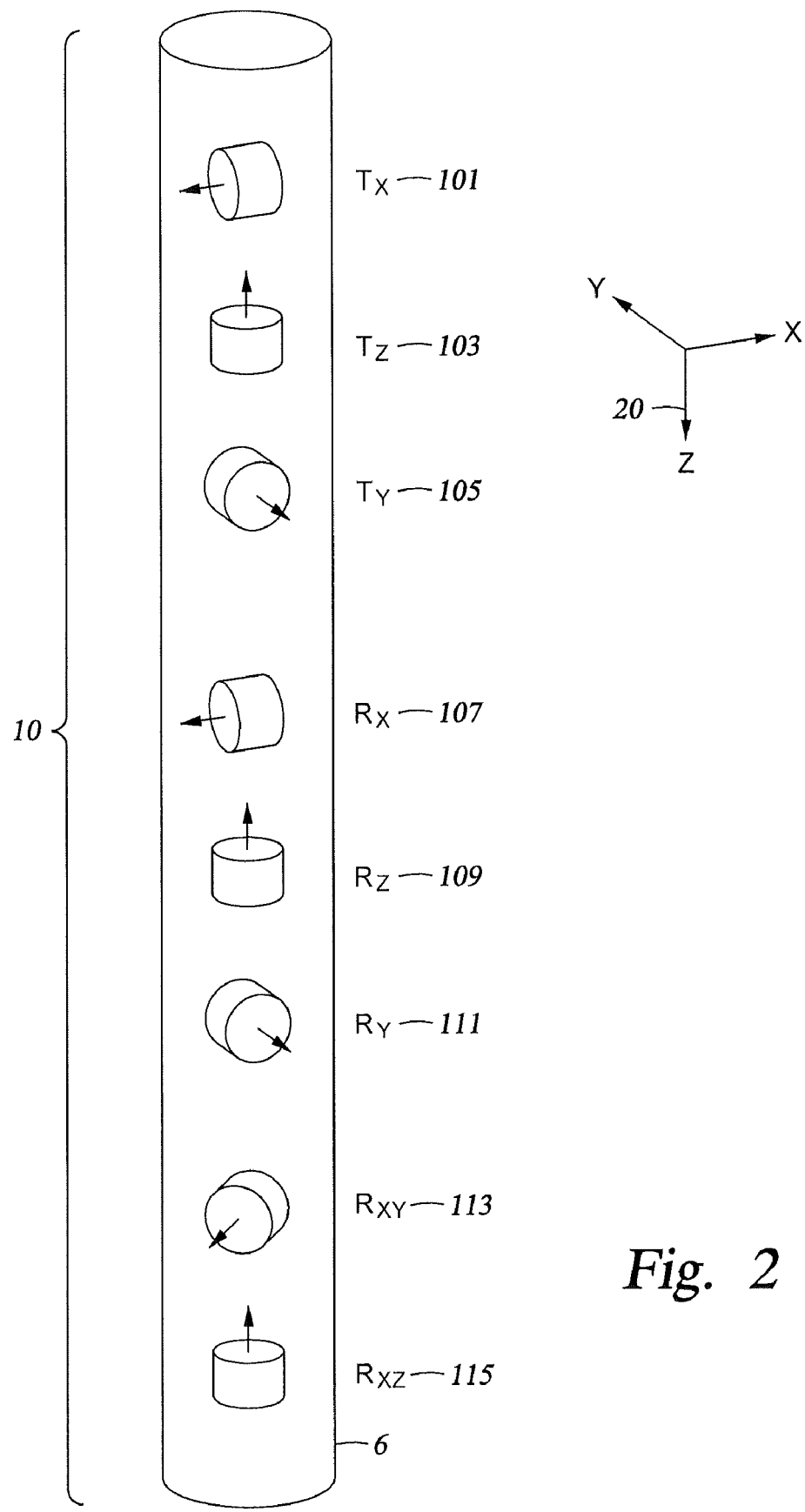
FIG. 2 depicts aspects of an electromagnetic instrument included within the drilling apparatus of FIG. 1.

Referring to FIG. 2, one embodiment of the set of coils includes transmitter coils and receiver coils as shown. Three transmitter coils 101, 103 and 105, referred to as the $T_x$, $T_z$, and $T_y$ transmitters are substantially orthogonally oriented (the z-axis being along the longitudinal axis of the tool, as depicted in the legend). The transmitter coils 101, 103 and 105 generate magnetic fields for obtaining measurements in the formations 2 surrounding the wellbore 7.

Corresponding to the transmitter coils 101, 103 and 105 are receiver coils 107, 109 and 111, referred to as the $R_x$, $R_z$, and $R_y$ receivers, respectively. The receiver coils 107, 109 and 111 measure aspects of the corresponding magnetic fields, and are also are substantially orthogonally oriented to each other. Additional receiver coils 113 and 115 may be included and measure two cross-components $H_{xy}$, and $H_{xz}$ of the magnetic field (H) produced by the x-component transmitter. One non-limiting example of the tool 10 is the 3DExplorer™ tool, which is an induction logging instrument produced by Baker Hughes, Incorporated of Houston, Tex. Further embodiments of instruments and services may be used, including, for example, instruments using multi-spacing, multi-frequency propagation instruments. Reference may be had to another exemplary instrument, such as that used in support of the AziTrak™ service provided by Baker Hughes, Incorporated, and referred to herein as an "azimuthal propagation resistivity tool."

Other embodiments of the EM instrument 10 may include those, for example, with side-by-side transmitter and receiver coils, and those having other arrangements of transmitters and receivers. Varying number of coils may be used. Therefore, it should be recognized this FIG. 2 depicts one embodiment of the well logging instrument 10, and is not limiting thereof. Further, in other embodiments, the additional coils 113, 115 are not included. Further examples include embodiments having transmitter coils and receiver coils with other or varying orientations.

The EM instrument 10 may provide an array of signals that are multiplexed in at least one of a time domain and a frequency domain. That is, a plurality of electromagnetic signals may be issued as a sequence of pulses and/or as a sequence of varying frequencies.

Generally, the well logging instrument 10 includes adaptations as may be necessary to provide for operation during drilling. In some embodiments, the adaptations may be realized for use after a drilling process has been performed. That is, it is not necessary that the teachings herein be employed strictly in a "while drilling" manner. Accordingly, wireline and other logging techniques may make use of aspects of the teachings herein after a drilling sequence has been completed.

As discussed herein, reference to the instrument 10 and aspects thereof generally refer to the exemplary and non-limiting embodiment, the 3DExplorer™ tool 10. More information regarding the instrument 10 may be had by turning to the paper "A new Multicomponent Induction Logging Tool to Resolve Anisotropic Formations" by Kriegshäuser, et al, SPWLA 41$^{st}$ Annual Logging Symposium, Jun. 4-7, 2000, the disclosure of which is incorporated by reference herein in its entirety.

As discussed herein, and for convention, there are four coordinate systems involved in the processing of multi-component induction logging data. The four coordinate systems include one for each of the earth 1, the formation 2, the instrument 10 and the coils 6. In typical embodiments, and by convention herein, the earth coordinate system 20 has a z-axis Z in the direction of gravity, an x-axis X pointing to the magnetic North, and a y-axis Y in the direction of magnetic East. The other three coordinate systems are defined relative to the earth coordinate system 20, depicted in FIG. 3A.

Figure 3A:
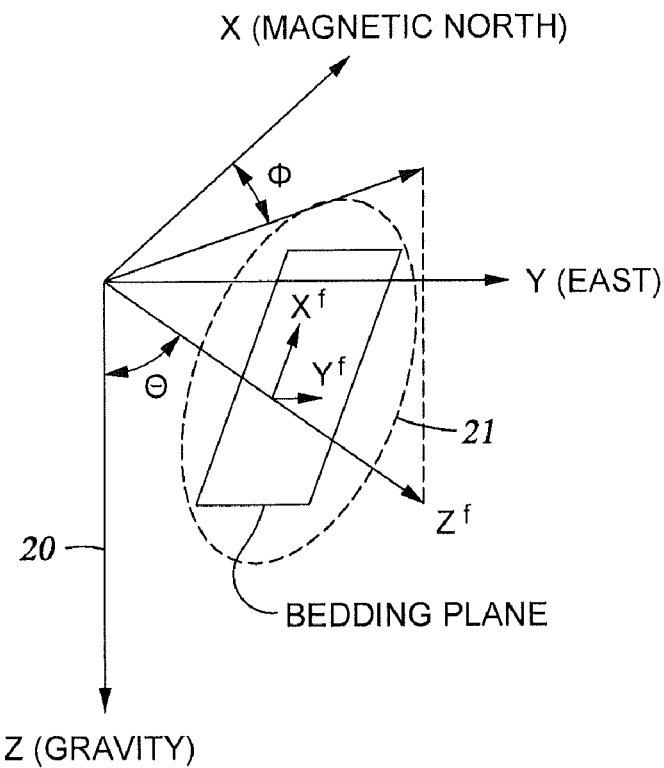
FIG. 3A and FIG. 3B, collectively referred to herein as FIG. 3, depict an earth coordinate system in relation to a formation coordinate system, and the earth coordinate system in relation to a tool coordinate system.

Referring to FIG. 3A, the earth coordinate system 20 is shown, with the axes as described in the preceding paragraph. The formation coordinate system 21 is also depicted, and shown relative to the earth coordinate system 20. An z-axis $Z^f$ of the formation coordinate system 21 is normal to a bedding plane 5, while an x-axis $X^f$ and a y-axis $Y^f$ are on the bedding plane, each of the axes ($Z^f$, $X^f$, $Y^f$) being orthogonally oriented. Two formation angles, depicted as a formation dip angle (θ') and a formation azimuth angle (Φ) describe a relationship between the earth coordinate system 20 and the formation coordinate system 21. Typically, the formation dip angle (θ') and the formation azimuth angle (Φ) are determined by use of inversion processing. A tool coordinate system 22 is depicted in FIG. 3B.

Figure 3B:
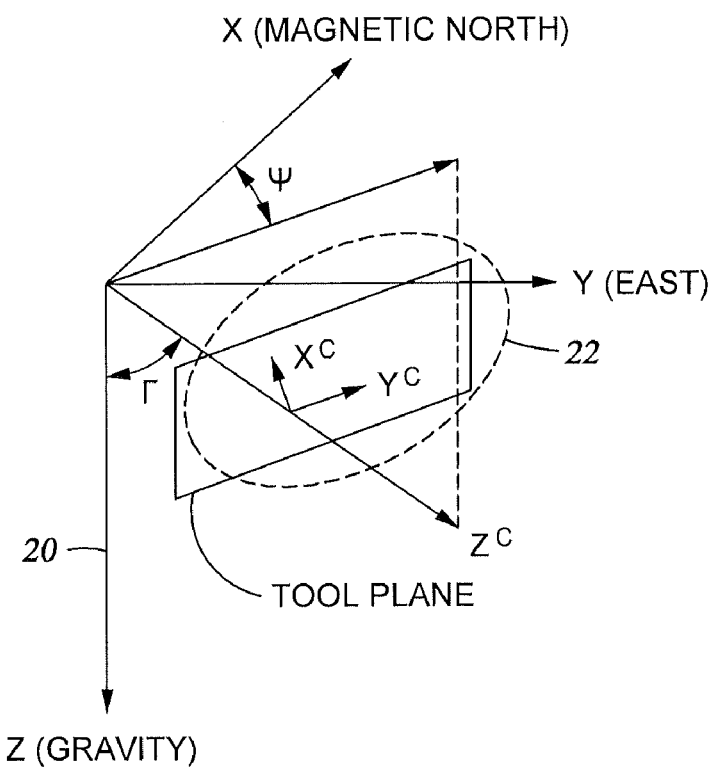

Referring to FIG. 3B, a z-axis $Z^t$ of the tool coordinate system 22 describes the trajectory of the wellbore 7 and is normal to a tool plane. The x-axis $X^t$ and the y-axis $Y^t$ of the tool coordinate system 22 are on the tool plane, each of the axes ($Z^t$, $X^t$, $Y^t$) being orthogonally oriented. The relation of the tool coordinate system 22 to the earth coordinate system 20 is described by a tool dip angle (Ψ) and a tool azimuth angle (Γ).

Figure 4:
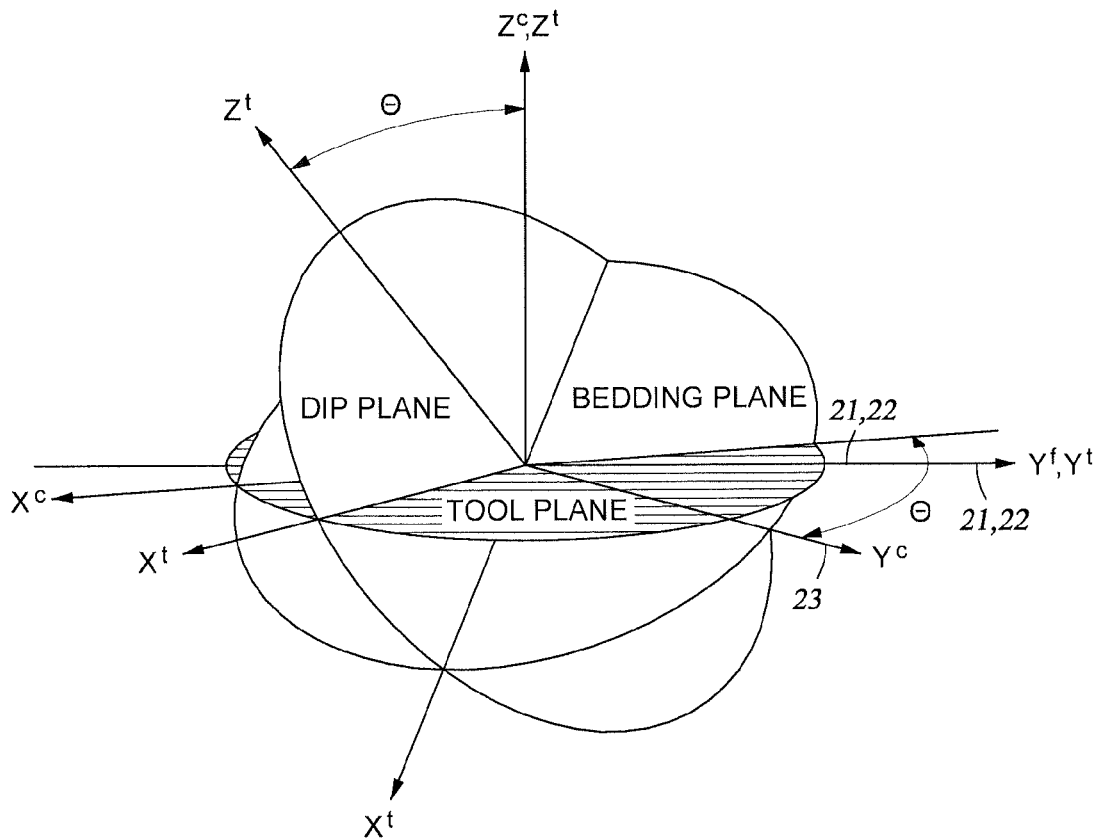
FIG. 4 depicts a coil coordinate system in relation to the earth coordinate system, the formation coordinate system and the tool coordinate system.
Figure 5A:
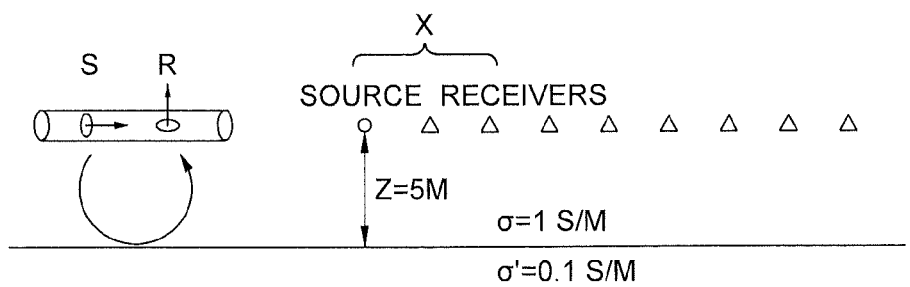
FIGS. 5A, 5B and 5C, collectively referred to herein as FIG. 5, depict simulated response data, where FIG. 5A provides simulated electromagnetic response from a bed boundary for an orthogonal transmitter-receiver configuration.
Figure 5B:
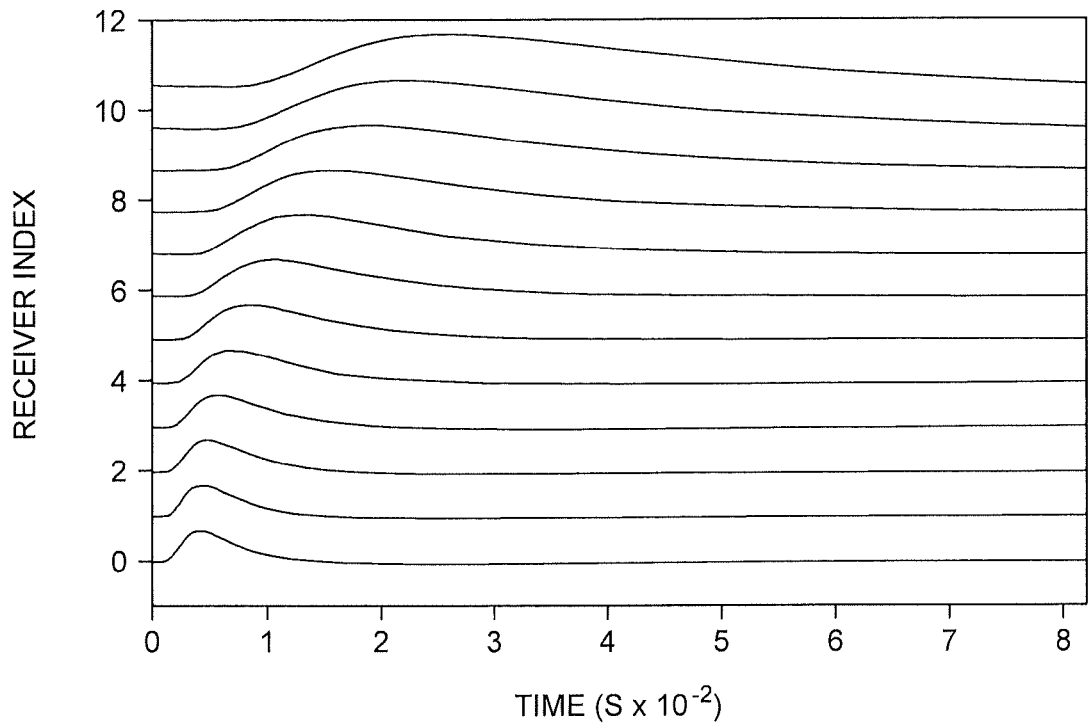
Figure 5C:
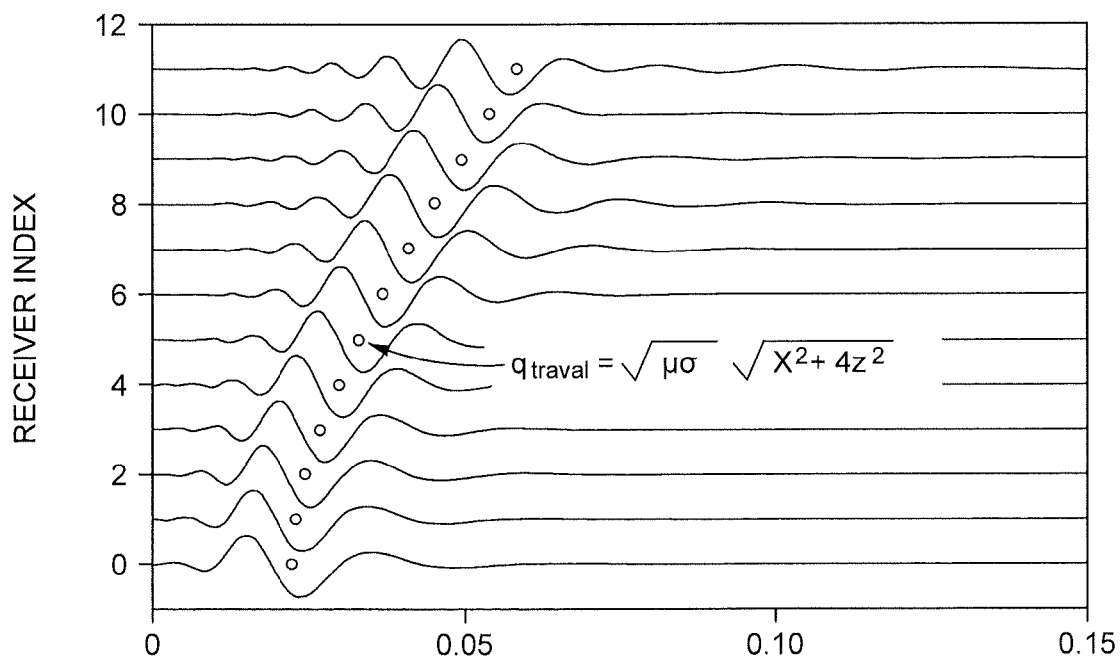

A combination of coordinate systems is depicted in FIG. 4. More specifically, the formation coordinate system 21, the tool coordinate system 22 and a coil coordinate system 23 are depicted in relation to each other. Referring to FIG. 4, a dip plane is also shown. The dip plane is described in the coil coordinate system 23, and includes an x-axis $X^c$, a y-axis $Y^c$ and a z-axis $Z^c$. The z-axis $Z^c$ of the coil coordinate system 23 shares the same z-axis $Z^t$ as the tool coordinate system 22, while the y-axis $Y^c$ of the coil coordinate system 23 is offset from the y-axis $Y^f$ of the formation coordinate system 21 by the formation azimuth angle (Φ). A relative tool rotation angle (φ) (not shown in FIG. 4) is described by the x-axis $X^c$ for the coil coordinate system 23, with respect to the high side of the wellbore 72.

In operation, the EM instrument 10 measures co-axial and co-planer components called main components, and also measures cross-components. These measurements provide information to determine, among other things, resistivity and anisotropy of the formation 2. With this information, other salient information may be obtained or derived. For example, with tool orientation data, the formation dip angle (θ') and the formation azimuth angle (Φ) can be obtained.

As used herein generation of data in "real-time" is taken to mean generation of data at a rate that is useful or adequate for making decisions during or concurrent with processes such as production, experimentation, verification, and other types of surveys or uses as may be opted for by a user. One non-limiting example includes information that is collected and provided at a rate that is adequate to aid in geosteering during a drilling operation, and to make other desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

As one embodiment provides for real-time logging applications, an efficient model is needed to simulate the electromagnetic (EM) response. Accordingly, an asymptotic solution is provided. A diffusive electromagnetic (EM) field can be transformed to a pseudo-wavefield using a "q-transform." Based on the transformation, the EM response of a boundary is analogized to acoustic reflection from the boundary. That is, the solution for the acoustic problem is used to derive a solution for the EM problem. After validating the EM solution using synthetic models, the second step is applying the solution to image boundaries of bed near the wellbore 7 using measured EM data collected while drilling. The validity and effectiveness of the imaging can be demonstrated using both synthetic and field data examples.

In one embodiment, an azimuthal propagation resistivity measurement instrument for logging-while-drilling (LWD) uses an axially oriented transmitter and a transversely oriented receiver to detect electromagnetic responses from a near-well bed boundary. A magnetic field, H, of the source can be estimated by solving a diffusion equation (i.e., neglecting displacement current) for a vector potential, F, as provided by Eqs. (1). As may be noted, this calls for modeling the transmitter as harmonically varying point dipole source, $Me^{-i\omega t}$, where M represents a magnetic moment of the source.

$$\nabla^2 F - \mu\sigma\frac{\partial F}{\partial t} = -i\omega\mu\delta(r)Me^{-i\omega t} \quad (1)$$

$$H = -\sigma F - \frac{1}{i\omega\mu}\nabla\nabla\cdot F$$

In Eqs. (1), δ represents a Dirac delta function, r represents a vector measured from the source, σ and μ represent electric conductivity and magnetic permeability of the medium surrounding the source, respectively. (Note that values for free-space are used, because changes of magnetic permeability, μ, in earth are generally small.) Now, placing the source at distance, z, from a plane boundary of a half space with electric conductivity σ, the magnetic field, H, arising from the boundary due to the source excitation, may be calculated using two approaches. The first approach uses the exact solution for two conductive half spaces, which will serve as references. The second approach is an asymptotic solution to be used for distance-to-bed imaging, which will be derived later herein using an analogy to the acoustic reflection theory.

A diffusive electromagnetic field, as represented by Eqs. (1), can be related to a pseudo wavefield U using the transformation provided in Eq. (2)

$$EM(t) = \frac{1}{2\sqrt{\pi t^3}} \int_0^\infty U(q) \cdot q e^{-\frac{q^2}{4t}} dq, \text{ (time domain)} \quad (2)$$

$$EM(\omega) = \int_0^\infty U(q) \cdot e^{-\sqrt{i\omega}q} dq, \text{ (frequency domain)}$$

where q is a pseudo "time" variable for the wavefield. The transform may be calculated either one of a time domain (EM(t)) and a frequency domain (EM(ω)). Since solving the electromagnetic problem will be performed by an analogy to acoustic wave reflection, pseudowave characteristics for reflection configurations have been analyzed.

Figure 6A:
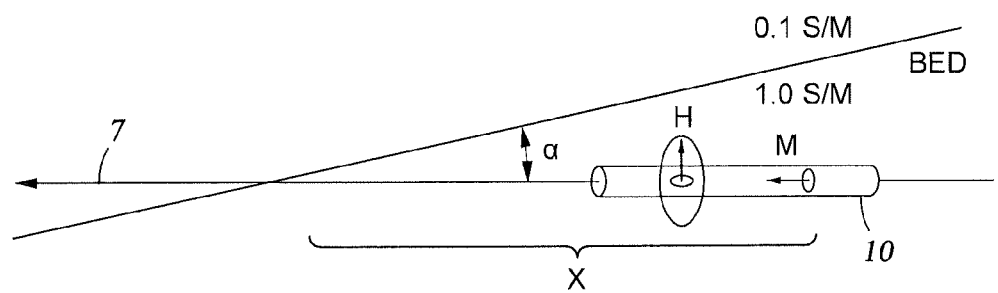
FIGS. 6A, 6B and 6C, collectively referred to herein as FIG. 6, depict further aspects of simulation, where

Refer now to FIG. 6A for a depiction of aspects of a solution to Eqs. (1). In this example, Eqs. (1) are solved for a horizontally-oriented dipole source at a five (5) meter (m) distance from a boundary to a geologic deposit of interest (referred to as a "bed"). In this example, the vertical component of the magnetic field, H, is calculated for all frequencies and Fourier-transformed to a time domain to get the impulse response from the boundary. The direct field is cancelled for the orthogonal transmitter-receiver orientation. The array of electromagnetic signals is then transformed to the q-domain using the time-domain formula of Eqs. (2) to yield pseudo-wave signals. Refer to FIG. 6C, which depicts a trace-equalized display. Apart from some artifacts due to the regularization required for the inverse transformation, travel time (markers) of the signal and associated moveout closely follow what would be calculated from acoustic reflection theory, as given by Eq. (3):

$$q_{travel} = \frac{1}{V}\sqrt{x^2 + 4z^2}, \text{ with } V = 1/\sqrt{\mu\sigma} \quad (3)$$

where x represents a source-receiver offset. This numerical example suggests that a large part, if not most, of the reflected pseudo-wave field can be modeled using acoustic reflection theory. A (scalar) pseudowave equation corresponding to Eqs. (1) is given by Eq. (4):

$$\nabla^2 U - \frac{1}{V^2}\frac{\partial^2 U}{\partial q^2} = \delta(r)e^{-i\omega q} \quad (4)$$

Using wavefront expansion along the reflection ray path, the solution of Eq. (4) for the reflection boundary, Fourier transformed over σ, is given by Eq. (5):

$$U(q) = \frac{R}{4\pi D}\left\{\delta(q - D/V) + u(q - D/V)\left[\sum_{n=1}^\infty a_n(q - D/V)^{n-1}\right]\right\} \quad (5)$$

where R represents a reflection coefficient at the boundary; D represents the travel distance to and from the boundary along the ray path; μ represents a Heaviside step function, and the a terms represent an expansion coefficient for higher order (n≧1) terms. For the application to be described, only the leading term of the above expansion is considered. This term, in language of acoustics, is called "wide-angle reflection," which models acoustic reflection phenomenon quite well. To model frequency-domain EM data measured by the logging-while-drilling resistivity instrument 10, the leading term is substituted into the second equation of Eqs. (2) to derive the vector potential of Eqs. (1). Assuming that the magnetic dipole source, M, is oriented in the sagittal plane containing vertical ($\hat{z}$) and horizontal ($\hat{x}$) directions, i.e., $M = M_z\hat{z} + M_x\hat{x}$. Then the vector potential, F(ω), is a result of combing two scalar potentials, as provided in Eq. (6):

$$F(\omega) \sim -\frac{i\omega\mu}{4\pi D}(M_z R_\perp \cdot \hat{z} + M_x R_{//} \cdot \hat{x})e^{-\sqrt{i\omega\mu\sigma}\,D} \quad (6)$$

One potential has the reflection coefficient $R_\perp$ corresponding to the vertical magnetic dipole $M_z$, while another has the reflection coefficient $R_{//}$ corresponding to the horizontal dipole $M_x$. The two reflection coefficients are about the same for small to medium incident angles, and, in the cases of large conductivity contrast, may be described by Eq. (7):

$$R_\perp \sim R_{//} \sim \begin{cases} 1, & \sigma \ll \sigma' \\ -1, & \sigma \gg \sigma' \end{cases} \quad (7)$$

For the imaging application to be described, it is important to image major geologic boundaries (e.g., water-oil or sand-shale contact). For those boundaries, the conductivity/resistivity contrast is large, or moderately large, and the condition expressed in Eq. (7) approximately holds. Accordingly, Eqs. (1), (6), and (7), plus the orthogonal source-receiver orientation condition (where H*M=0), are combined to give Eq. (8):

$$H = \pm\frac{1}{4\pi}\nabla\nabla\cdot\left(M\frac{e^{-\sqrt{i\omega\mu\sigma}\,D}}{D}\right) \quad (8)$$

where the "+" and the "−" sign corresponds to σ≪σ' and σ≫σ', respectively. The resulting magnetic field, H, is in a plane transverse to the tool axis. The azimuthal variation of the magnetic field, H, in this plane is used to determine a bed-boundary azimuth. The imaging application to be described uses the component of the magnetic field, H, in the sagittal plane along the tool axis. This component may be derived as provided in the following.

In order to provide the imaging application, a two-dimensional (2D) Cartesian coordinated x-z centered at the source is defined in the sagittal plane, with x along the tool axis and z normal to the axis. Reference may be had to FIG. 6A. Assume that a bed plane near the wellbore 7 makes an angle α with the tool axis and the distance from source to the bed intersection point is X. For this situation, the travel distance D from source to the received position x, as follows from Snell's law for acoustic reflection, is given by Eq. (9):

$$D = \sqrt{x^2 + 4X(X-x)\sin^2\alpha} = \sqrt{x^2 + 4z_e^2} \quad (9)$$

Equation (9) suggests the use of an equivalent bed-to-tool distance as a new variable, as given by:

$$z_e = \sqrt{X(X-x)\sin^2\alpha}$$

In fact, $Z_e$ represents the geometric average of the source-to-bed and receiver-to-bed distances and should therefore be equivalent to the distance from bed to central part of the tool 10 between source and receiver. Using the equivalent distance is particularly advantageous in the imaging application where the distance to a local bed in the vicinity of the tool is imaged, regardless of its angle with the tool. Connecting the distance for various positions of the tool 10 delineates the bed angle. Using x and $Z_e$ as independent variables in Eq. (8), the magnetic field component in the sagittal plane, now denoted by a scalar function H, is obtained as $$H = \pm \frac{i\omega\mu\sigma M}{\pi D} \cdot \frac{z_e}{D} \cdot \frac{h}{D} e^{-\sqrt{i\omega\mu\sigma} D} \quad (10)$$

where h represents the source-receiver offset, replacing x after the operation in Eq. (8) and M represents source magnetic moment magnitude. In deriving Eq. (10), only the leading term of Eq. (8) is considered in order to follow the asymptotic order from the leading term in Eq. (5). The asymptotic solution will later be used for imaging application.

Before applying the above asymptotic EM solution for imaging, validation of the solution is provided in comparison to the exact solution. For validation purposes, the measurement of the azimuthal propagation resistivity (APR) tool 10 is simulated as crossing a bed boundary at 15° angle or 85° relative dip angle, as described by FIG. 6A. The actual transmitter-receiver configuration of the tool 10 may be of the type described in U.S. Pat. No. 7,057,392 to Wang et al., entitled "Method and Apparatus for Directional Resistivity Measurement While Drilling," which patent is hereby incorporated by reference herein in its entirety. Other embodiments of the tool 10 may be used. For the model in FIG. 6A, the bed conductivities are 1 and 0.1 S/M, respectively. The simulation respectively uses the asymptotic solution in Eq. (10) and an exact method that was used to model the tool response.

Figure 6B:
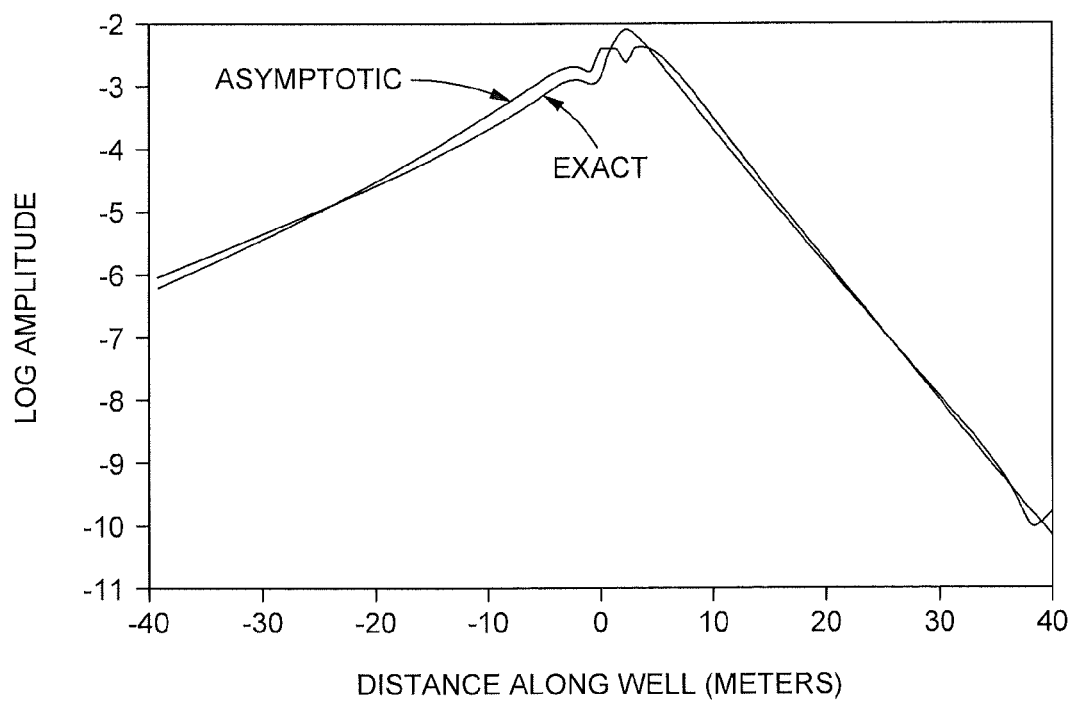
Figure 6C:
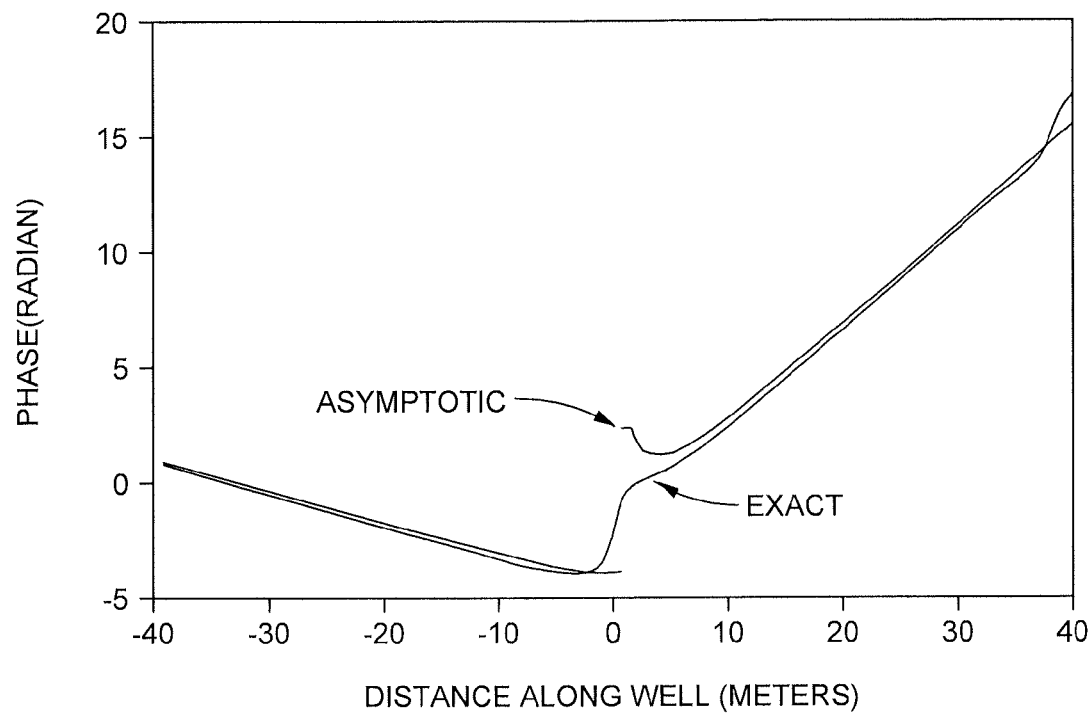

FIG. 6 compares the calculated responses for the magnetic field, H, using two methods. There are moderate differences on both amplitude (FIG. 6B, using a logarithmic scale) and (unwrapped) phase (FIG. 6C, shown in radians) responses between the two results, especially close to the boundary. Note that the approximately 1-π phase change across the boundary, as seen from both solution results, reflects the sign change in the reflection coefficient (e.g., see the "±" sign in Eq. (10)). Away from the boundary, the asymptotic solution closely simulates the amplitude decay and phase of the exact solution. This result indicates that the asymptotic solution correctly models the far-field diffusion process of the EM wave.

The asymptotic solution in Eq. (10), due to its simplicity, can be used to perform fast modeling of logging-while-drilling electromagnetic data in an inversion/imaging process. Instead of using it to directly calculate the bed-to-well distance, an imaging procedure has been formulated to visualize both bed-boundary location and goodness of fit between model and data.

Figure 7:
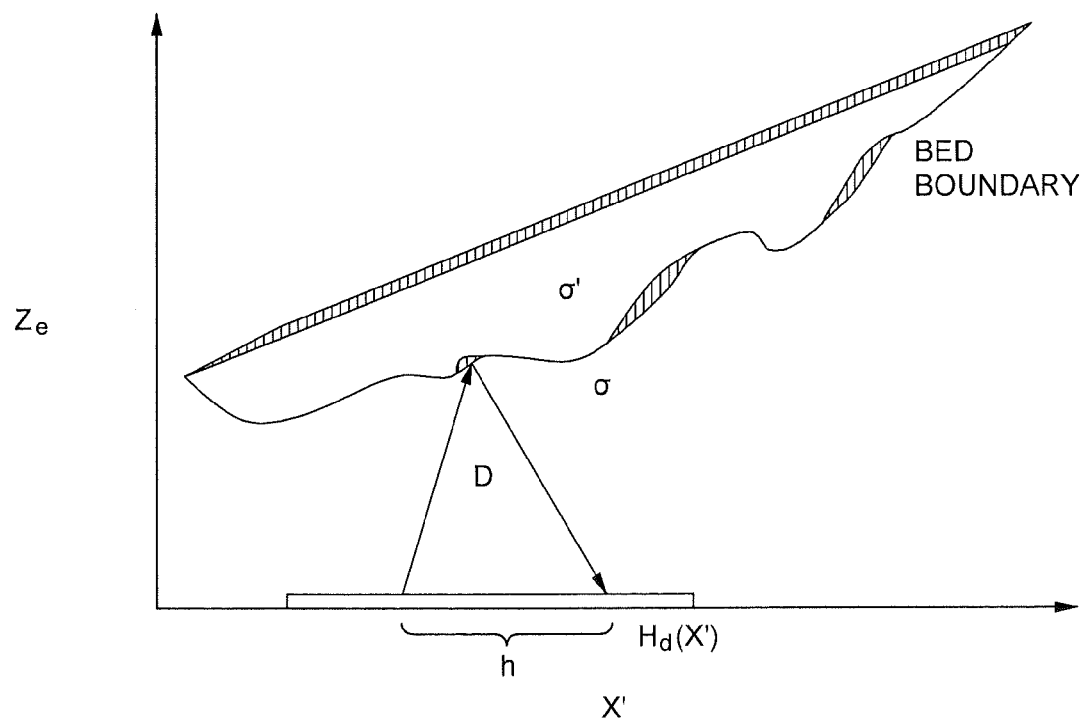
FIG. 7 provides a two-dimensional (2D) grid for mapping a fitness function fitted to data $H_d$ into formation, where near-well bed boundaries are imaged by tracking a maximum of the fitness function.

In the imaging procedure, the formation is discretized into a two-dimensional (2D) grid (refer to FIG. 7). One dimension is along the radial direction from the wellbore 7, parameterized by the tool-to-bed distance, $Z_e$. Another dimension is along a trajectory for the wellbore 7, parameterized by the tool position X', where the magnetic field data $H_d$ is measured. To model the magnetic field data, $H_d$, using the function of Eq. (10), the magnetic dipole moment and the source-receiver spacing h of the tool are obtained from the tool used. The formation conductivity σ(X') at the tool position X' is also known, as is usually measured from another resistivity device in the drill string 3. With these descriptions and Eq. (9), it is understood that H may now be expressed as a function of the grid variables $Z_e$ and X'.

By fitting the H function with the magnetic field data, $H_d$, the fitness function provided in Eq. (11) may be realized:

$$\text{Fitness}(x', z_e) = \sum_{n=1}^{2} \exp\left\{-\frac{1}{L} \int_{x'-L/2}^{x'+L/2} \left[\left(\log\left\|\frac{H_d(x)}{H(x, z_e)}\right\|\right)^2 + \left(\arg\left[(-1)^n \frac{H_d(x)}{H(x, z_e)}\right]\right)^2\right] dx\right\} \quad (11)$$

where ∥ . . . ∥ denotes taking the amplitude of the quantity inside; arg denotes taking the phase of the quantity. The amplitude and phase terms are averaged over an interval of length L with x' being the center point. This averaging suppresses noises in data. The function consists of the summation of two terms, which are related to the "+" and "−" sign of the solution in Eq. (10), respectively.

The structure of the fitness function, Fitness(X', $Z_e$), and the role in the imaging is now described in greater detail. In general, the fitness function compares the amplitude ratio and phase difference between the magnetic field data, $H_d$, and the calculated magnetic field, H. When the calculated magnetic field H fits the magnetic field data, $H_d$, the argument of the exponential function approaches zero and the fitness function approaches a maximum value of unity. On the other hand, when the misfit between the magnetic field data, $H_d$, and the calculated magnetic field, H, is large, the fitness function approaches zero. Thus the fitness function is a measure of goodness of fit between the magnetic field data, $H_d$, and the calculated magnetic field, H, and has the property of:

0<Fitness<1.

Fitting both magnitude and phase of the magnetic field data, $H_d$, is advantageous. The comparison of FIG. 6 shows that the phase of the asymptotic solution is more accurate than the amplitude, especially away from the boundary. Thus, phase fitting may alleviate the amplitude inaccuracy of the solution. The phase function, however, my suffer a 2π uncertainly in addition to the π uncertainly related to the "±" sign in the uncertainties. Fitting the amplitude helps resolve the uncertainties. For example, for a false distance that produces a 2π difference relative to the phase of a correct distance, the large amplitude misfit will render an almost zero function value for the incorrect distance.

For the π-uncertainty issue, the phase difference of the first summation term in Eq. (11) differs from that of the second term by π, corresponding to whether the reflecting boundary has a higher or lower conductivity relative to incident medium. The conductivity value σ of the medium (formation surrounding the tool 10), as used in calculating the fitness function, appropriately dictates the correct distance to fit both amplitude and phase of one of the terms. When one term is fit or maximized (~1), the remaining term almost vanishes (~0). Thus, the two-term structure enables finding the correct distance regardless whether the approaching bed boundary is more resistive ($\sigma > \sigma'$) or conductive than the formation surrounding the tool 10.

From the above, it can be seen that the fitness function attains maximum at an appropriate boundary position X', $Z_e$ mapped by the travel distance, D. As a result, the high-values region of the fitness function effectively images the bed-boundary position over the 2D grid. Good imaging quality corresponds to high function values with sharp, continuous features, while poor image is reflected by low-value features with large spread or smearing. Thus the image and its visualization indicate both bed-boundary location and goodness of fit between model and data.

Figure 8A:
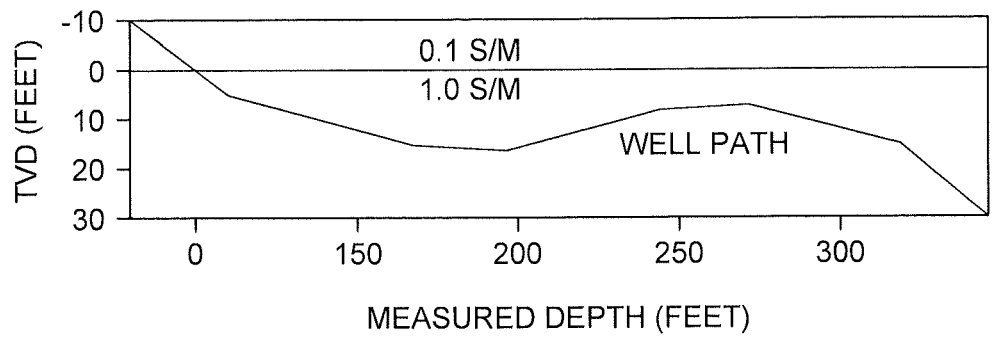
FIGS. 8A, 8B and 8C, collectively referred to herein as FIG. 8, depict aspects of a test of imaging by using a model provided in FIG. 8A to calculate synthetic data shown in FIG. 8B, the resulting image of FIG. 8C is compared with a true well-to-bed distance.
Figure 8B:
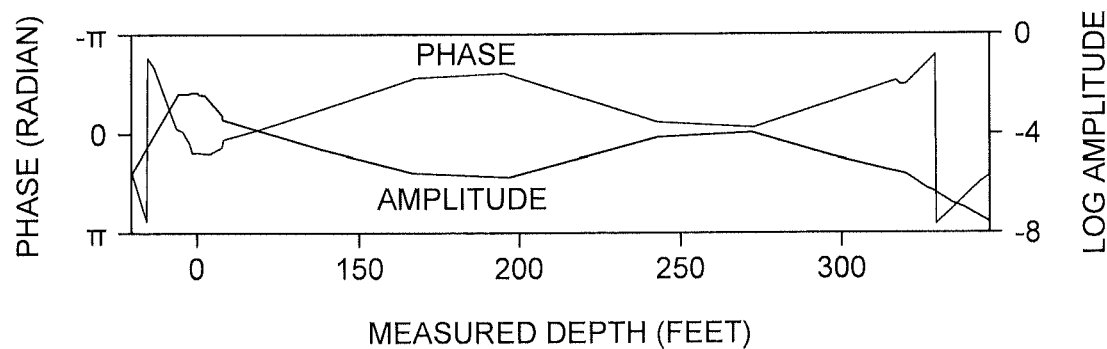
Figure 8C:
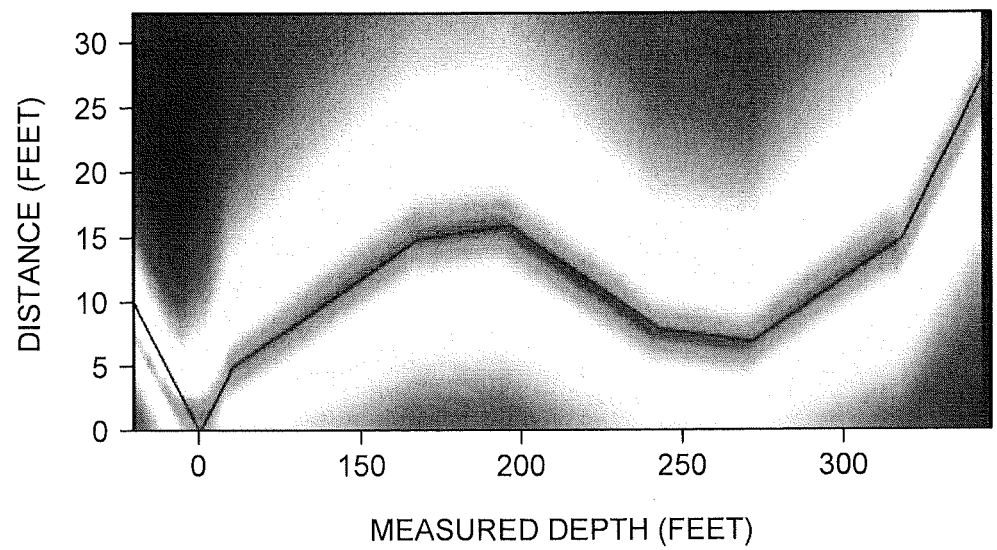

To test the accuracy and applicability of the developed imaging procedure, we use it to process some synthetic data sets and, after the synthetic testing, apply it to a field data set. FIG. 8A shows the well path penetrating a horizontal bed. The resistivity for the upper and lower formations is 1 and 10 ohm-m, respectively. Displayed in FIG. 8B are the amplitude (logarithmic scale) and (wrapped) phase of the synthetic data $H_d$ calculated for the model using exact modeling. The data are input to the imaging procedure. The resulting image shown in FIG. 8C is overlain with the true distance to bed (solid curve) used in the model. The peak value of the image coincides with the distance curve quite well, validating the imaging result.

Figure 9A:
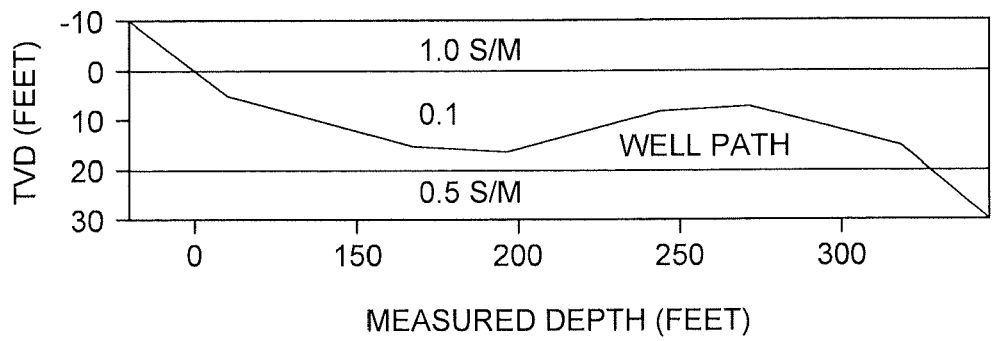
FIGS. 9A, 9B and 9C, collectively referred to herein as FIG. 9, depict aspects of a test of imaging by using a two-boundary model provided in FIG. 9A to calculate synthetic data shown in FIG. 9B, the resulting image of FIG. 9C is compared with a true well-to-bed distance.
Figure 9B:
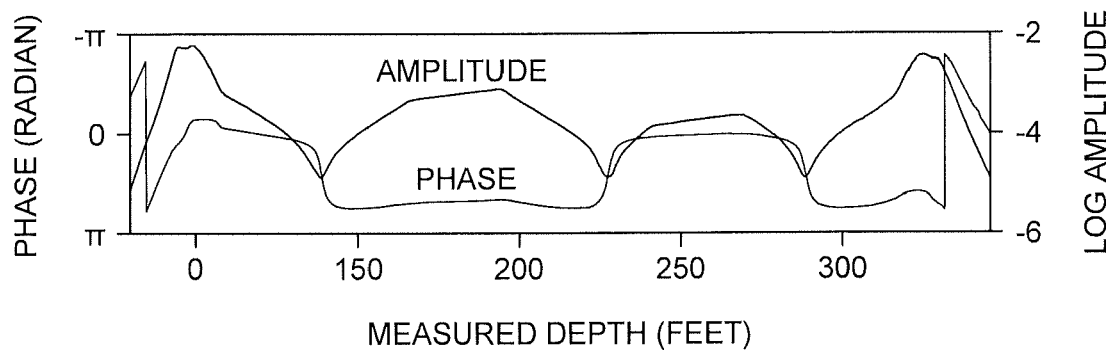
Figure 9C:
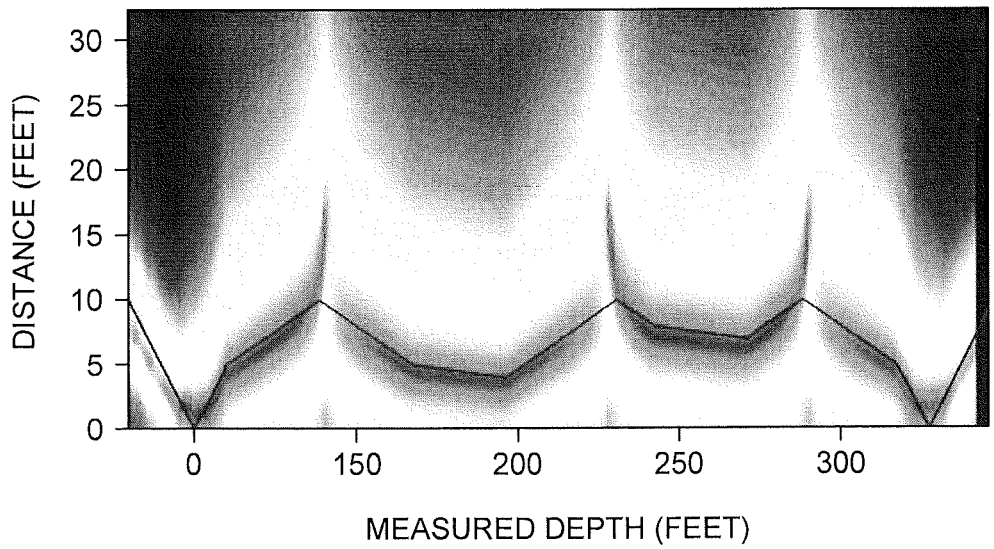

The second example, provided in FIG. 9 has the same well path as that of FIG. 8 penetrating a 20-ft (6.1-m) thick formation layer between two formations. The resistivity of the upper, middle, and lower formation is 1, 10, and 2 ohm-m, respectively. The calculated synthetic data are displayed in FIG. 9B. The imaged bed distance (peak image region in FIG. 9C) agrees with the true distance (curve) reasonably well, considering that the (synthetic) data inside the formation layer contains the effects from upper and lower bed boundaries. Three sharp changes in the image occur around the electrical midpoints where the APR response crosses zero. In this situation, the responses from the upper and lower boundaries tend to cancel the amplitude of the total response data $H_d$. Consequently, a large distance value is assumed in the H function in order to fit the data, resulting in the sharp increase distance. This jump to large distance occurrence is adjacent to a low-value region, as indicated by a discontinuous, smeared feature at the locations. Away from the three equal-distance locations, the imaged distance corresponds to the distance nearer (of the upper or lower) bed. Besides demonstrating the validity of the imaging even for the layered model, this example shows that the image quality provides an assessment of the goodness of fit between data and model.

Figure 10A:
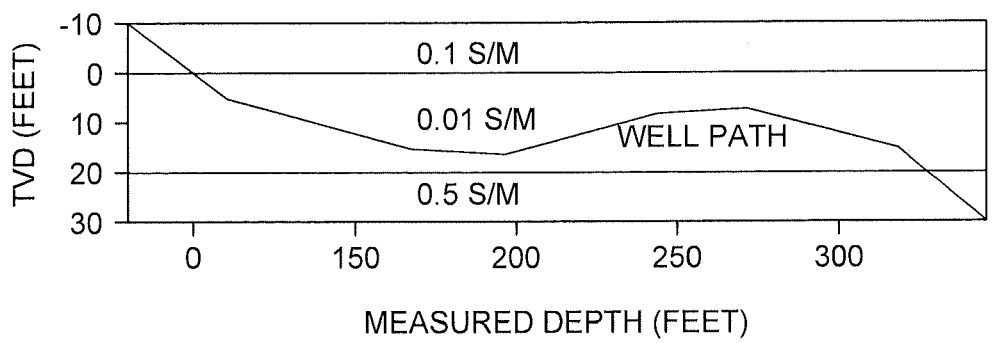
FIGS. 10A, 10B and 10C, collectively referred to herein as FIG. 10, depict aspects of a test of imaging by using a two-boundary model, but with a highly resistive middle layer, where the model is provided in FIG. 10A for calculating synthetic data shown in FIG. 10B, the resulting image of FIG. 10C indicates a poor fit of the model in the layer.
Figure 10B:
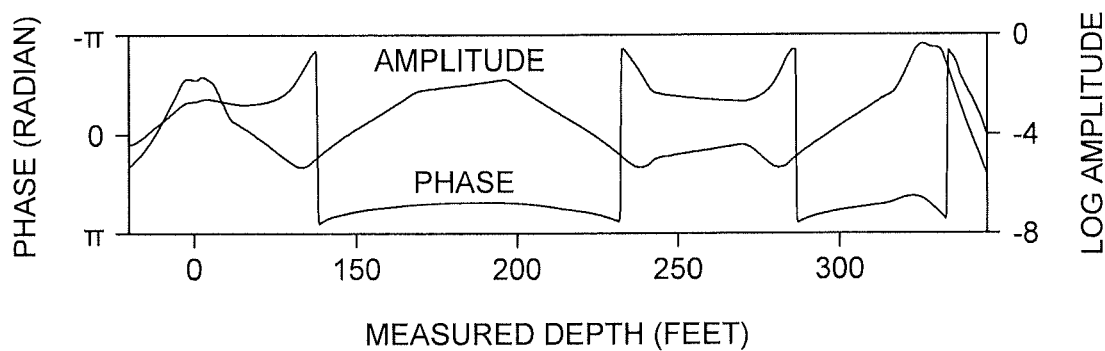
Figure 10C:
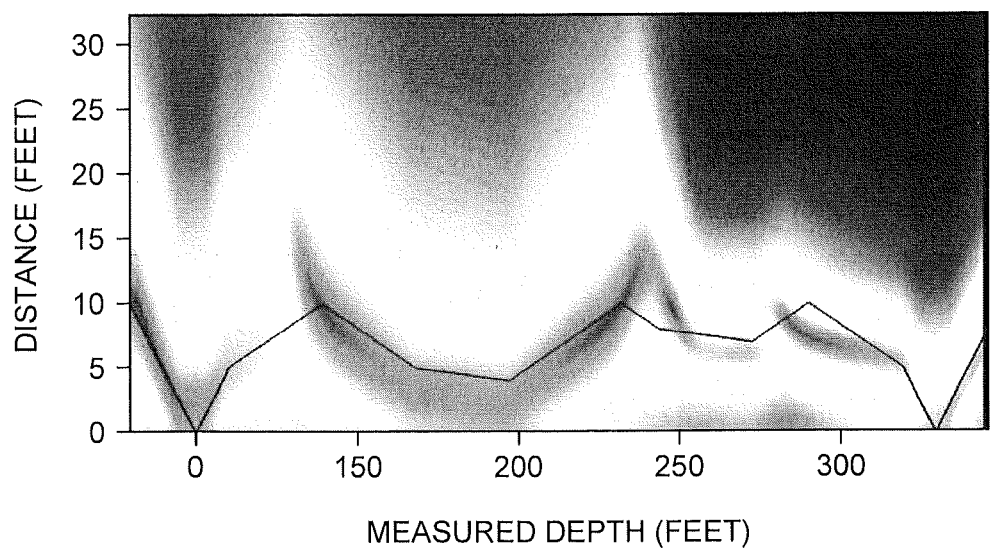

The third example (FIG. 10) has the same model geometry of FIG. 9, with resistivity of the upper, middle, and lower formation being 10, 100, and 2 ohmm, respectively. Note that the middle layer is highly resistive. As a result, the match between true and imaged bed distances inside the layer degrades, especially near the bed. The three discontinuous image features similar to those in FIG. 9B also exist. Because the upper shoulder bed, the electrical midpoints move closer to the upper shoulder bed. Also, because of the high resistivity of the middle layer, the EM field inside the layer has larger contributions from the two shoulder beds, making it difficult to fit the single-boundary solution (Eq. (10)) to the data. Despite a poor fit, the image still delineates a rough trend of the bed to signal the presence of near-well beds. For geosteering applications, the awareness of an approaching near-well boundary is useful information for decision making purposes.

Figure 11A:
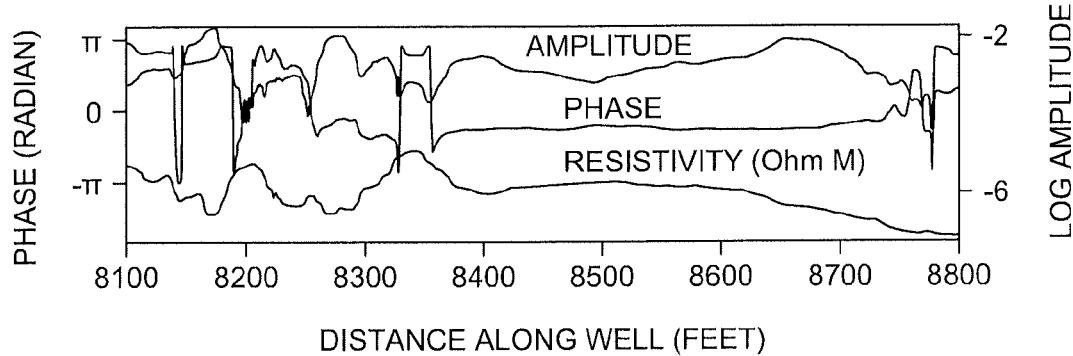
FIGS. 11A and 11B, collectively referred to herein as FIG. 11, depict an imaging application with a LWD data set, as shown in FIG. 11A, while in FIG. 11B the resulting bed image is compared with a result from inversion (dotted curve), the variation of the imaged bed boundary is compared with bed azimuth (rose diagrams) to indicate bed-crossing (left), above (middle), and below (right) situations.
Figure 11B:
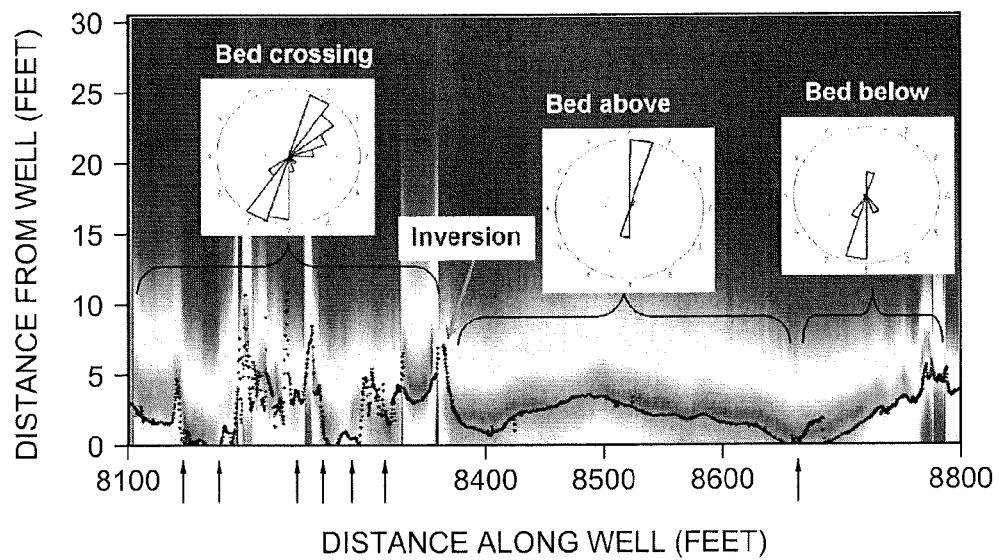

The example of FIG. 11 is an APR data set in a North Sea well. FIG. 11A shows the amplitude and phase responses of the APR data, which provide the needed magnetic field data, $H_d$, for the imaging. A 400 kHz attenuation resistivity curve is also shown, which provides the formation conductivity data for the imaging. FIG. 11B shows the imaged near-well bed position, along with the bed-distance curve. The inversion constructs a layered conductivity contrast between layers, neglects the effects of moderate contrast. Despite the possible effect of moderate conductivity contrast that may be present in data, the imaging result based on the asymptotic model agrees reasonably well with that of the model-based inversion. This again, as shown in the comparison of FIG. 6, shows that the diffusion effect is the first order effect in the near-boundary EM response, which is captured by the asymptotic solution in Eq. (10).

The bed-boundary image can be combined with the bed azimuth information determined from multiple azimuth measurements. This combination provides more complete information about the configuration of a near-well bed. The azimuth information also provides a consistency check for the imaged bed-distance information. The azimuth information can be displayed using a rose diagram, indicating the azimuthal distribution of the beds over a measurement interval. The well section of FIG. 11B is divided into three intervals with their respective azimuthal distributions. The left interval, from 8,100 to 8,400 ft, shows that the bed azimuths are almost equally distributed above the and below the well. Correspondingly, the bed image shows several features that collocate with the well path, as indicated by arrows. They indicate the locations where the well crosses a bed. For this bed-crossing situation, the image features closely resemble those of the synthetic multiple layered model examples (see FIGS. 9 and 10).

From 8,400 to 8,700 ft, the image shows a major continuous feature at a distance of about 3 ft to about 5 ft away from the well, which is similar to the single-layer model example in FIG. 8. The rose diagram for this interval shows that the bed is right above the well. The well penetrates the bed around 8,700 ft, where the imaged feature merges with well path, as indicated by an arrow. The rose diagram for the last section beyond 8,700 ft shows that the bed is right below the well. The image result is thus consistent with azimuth information. Combining the two results will therefore significantly enhance geosteering capability using the LWD data.

From the foregoing description of a preferred embodiment of the invention, it will be apparent to those of ordinary skill in the art that the APR response from a planar bed boundary is mostly controlled by the diffusion process to and from the boundary. Because of this, in accordance with one aspect of the invention, the pseudowave analogy of the EM field can be used to derive an asymptotic solution from acoustic reflection theory. This solution is validated using synthetic and field data examples. Because of its effectiveness and efficiency, the asymptotic solution can be applied to obtain real-time images of near-well geologic bed boundaries. Accordingly, a procedure is provided which includes a fitness function for simultaneously fitting both the amplitude and phase of the EM data using the solution. The resulting image has also been validated through application to field data.

Accordingly, provided herein is an effective and efficient electromagnetic imaging method to obtain well-to-bed distance of near-well geologic bed boundaries from a logging-while-drilling (LWD) azimuthal propagation resistivity (APR) tool. The distance information, combined with the azimuth information from APR measurement, can significantly enhance geo-steering capability. In accordance with one aspect of the invention, the approach utilizes the analogy of acoustic reflection to the EM problem and derives a fast and reasonably accurate formula to model the APR data, allowing for constructing a fitness function to fit the data with the modeling. The imaging processing of the data is accomplished by mapping the fitness function into the formation surrounding the well bore. The fast modeling method, together with the imaging processing, can be implemented and integrated with current APR processing to provide real-time information for well-bore placement.

Having described methods and apparatus related to this invention, it should be recognized that various aspects may be governed by at least one of the electronics units 11, 12, which may include aspects such as processing and machine readable and machine executable instructions stored therein, or provided thereto. For example, the EM instrument 10 may provide data to at least one of the electronics unit(s) 11, 12. The instructions provide for receiving the EM data, estimating a travel time for at least one pseudo wave reflected from a geologic feature (e.g., a bedding plane), and estimating at least one of a direction and a distance to the bedding plane. The instructions may then be translated to commands for adjusting steering apparatus of the drill string 3, such that the drill string 3 is steered in an appropriate direction. Further, image processing and quality control may be achieved by comparison of actual data to calculated data, as well as by use of other information collected.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

Further, it should be recognized that certain aspects provided herein, such as those involving geometric orientation, are merely illustrative of the invention and are not limiting. That is, such aspects may be performed in additional or other dimensions.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for imaging a geologic deposit using data collected from a borehole, the method comprising:
    selecting an instrument for performing electromagnetic (EM) measurements, the instrument comprising at least one transmitter and at least one receiver oriented at an angle with respect to the at least one transmitter;
    obtaining EM measurement data of the geologic deposit from the borehole with the instrument;
    entering the EM measurement data into a fitness function configured to measure a fit between the measured EM data and calculated EM data as a function of a distance from the instrument to the deposit; and
    estimating with a processor the distance from the instrument to the deposit using the fitness function to image the geologic deposit wherein the distance is associated with a fitness value.

2. The method as in claim 1, wherein the calculated EM data is calculated using a transform of an EM field to a pseudo-wavefield.

3. The method as in claim 2, wherein the estimating comprises estimating a travel time for the wavefield.

4. The method as in claim 1, wherein the obtaining comprises issuing a plurality of electromagnetic signals that are varied in at least one of a time domain and a frequency domain.

5. The method as in claim 1, further comprising estimating at least one of a vertical component and a horizontal component of a magnetic field associated with the electromagnetic measurements.

6. The method as in claim 5, further comprising performing the estimating for a plurality of frequencies.

7. The method as in claim 6, wherein the transforming comprises obtaining an impulse response in a time domain from the plurality of frequencies.

8. The method as in claim 2, further comprising modeling a wide-angle reflection of the EM field transformed to a pseudo-wavefield.

9. The method as in claim 1, wherein the angle is an orthogonal angle.

10. The method as in claim 1, wherein the fitness value is a maximum.

11. The method as in claim 1, wherein the geological deposit comprises a bed angle and the method further comprises estimating the bed angle using the estimated distance.

12. The method as in claim 2, wherein the EM field transformed to a pseudo-wavefield is modeled using acoustic reflection theory.

13. A non-transitory computer readable medium containing computer instructions stored therein for identifying a boundary of a geologic feature by causing a computer processor to perform a method comprising:
    obtaining electromagnetic (EM) measurement data from a borehole near the geologic feature with an EM instrument comprising at least one transmitter and at least one receiver oriented at an angle with respect to the at least one transmitter;
    entering the EM measurement data into a fitness function configured to measure a fit between the measured EM data and calculated EM data as a function of a distance from the instrument to the boundary; and
    estimating the distance from the instrument to the boundary using the fitness function wherein the distance is associated with a fitness value.

14. The computer program product as in claim 13, further comprising instructions for providing steering commands derived from the estimated distance to the boundary.

15. The computer program product as in claim 13, wherein the steering commands provide for steering a drill string in relation to the boundary.

16. The computer program product as in claim 13, wherein the fitness function provides a tool-to-bed distance, $Z_e$, and a parameterized tool position, X'.

17. The computer program product as in claim 13, wherein the angle is an orthogonal angle.

18. The computer program product as in claim 13, wherein the fitness value is a maximum.

19. A system for steering a drill string, the system comprising:
   an electromagnetic (EM) instrument comprising at least one transmitter and at least one receiver oriented at an angle with respect to the at least one transmitter and comprised with the drill string;
   at least one processor comprising machine executable instructions stored on machine readable media for receiving electromagnetic (EM) measurement data from the instrument and entering the EM measurement data into a fitness function configured to measure a fit between the measured EM data and calculated EM data as a function of a distance from the instrument to a boundary of a geologic feature; estimating the distance from the instrument to the boundary using the fitness function wherein the distance is associated with a fitness value; and generating steering commands from the distance from the instrument to the boundary; and
   a steering system for receiving the steering commands and adjusting a direction of the drill string.

20. The system as in claim 19, wherein the adjusting is performed in real time.

21. The system as in claim 19, wherein the angle is an orthogonal angle.

22. The system as in claim 19, wherein the fitness value is a maximum.

* * * * *